(12) United States Patent
Seiver et al.

(10) Patent No.: US 6,622,521 B2
(45) Date of Patent: Sep. 23, 2003

(54) ADAPTIVE CONTROL FOR AIR SEPARATION UNIT

(75) Inventors: David S. Seiver, Houston, TX (US); Ovidiu Marin, Lisle, IL (US)

(73) Assignees: Air Liquide America Corporation, Houston, TX (US); American Air Liquide, Inc., Fremont, CA (US); L'Air Liquide, Societe Anonyme A Directoire et Consell de Survelliance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/109,063

(22) Filed: Mar. 29, 2002

(65) Prior Publication Data

US 2003/0131625 A1 Jul. 17, 2003

Related U.S. Application Data

(60) Provisional application No. 60/286,994, filed on Apr. 30, 2001.

(51) Int. Cl.[7] .................................................. F25J 3/00
(52) U.S. Cl. .......................................... 62/656; 62/657
(58) Field of Search .......................... 62/643, 646, 656, 62/657

(56) References Cited

U.S. PATENT DOCUMENTS 3,912,476 A * 10/1975 Mikawa et al. ............... 62/646
5,313,800 A * 5/1994 Howard et al. ............... 62/656
5,522,224 A * 6/1996 Canney ........................ 62/656
5,666,825 A * 9/1997 Darredeau et al. ............ 62/656
5,983,668 A * 11/1999 Espie ........................... 62/656
6,055,524 A    4/2000 Cheng

OTHER PUBLICATIONS

David S. Seiver & Les Dupre, "A Pyramid Approach to Advanced Control"; Optimizing Each Tier of a Layered System Architecture Maximizes Energy Efficiency and Return on Investment at Air Liquide America, Control Magazine, Jun. 29, 2000, pp. 1–5.

* cited by examiner

Primary Examiner—William C. Doerrler
(74) Attorney, Agent, or Firm—Linda K. Russell

(57) ABSTRACT

An air separation unit including an air intake, a high pressure cryogenic distillation column receiving air from the air intake and producing an oxygen rich liquid reflux, and a low-pressure cryogenic distillation column. An adaptive controller controls the flow rate of the oxygen-rich liquid from the first distillation column into the second distillation column, wherein during plant upsets, the adaptive controller maintains the level of oxygen-rich liquid in the first distillation column at a substantially constant level by adjusting a flow rate of the oxygen rich liquid into the second distillation column, and wherein the argon content of the argon-rich output stream from the second distillation column remains substantially constant.

29 Claims, 7 Drawing Sheets

ADAPTIVE CONTROL FOR AIR SEPARATION UNIT

This application is related to, and claims priority from, U.S. Provisional Application 60/286,994, entitled Model-Free Adaptive Control to Increase Production in Air Separation Units, which was filed in the United States on Apr. 30, 2001, the entire content of which is hereby incorporated by reference.

BACKGROUND OF THE INVENTION

1. Field of the Invention

This invention relates to an air separation unit, and specifically to an adaptive controller for an air separation unit.

2. Background Information

Cryogenic Air Separation Units (ASUs) have been used to produce oxygen, nitrogen, and argon, and other gases, as desired. An ASU generates gases by refrigerating air and distilling it, so energy is the primary production cost of an ASU. Air Separation Units may be integrated into a network, with a centrally managed pipeline network for transporting the output gases to customers, or can be stand-alone units without a network connection.

Traditional regulatory controllers, such as PID controllers, can be used to control various flow rates in an air separation unit. For example, PID controllers have been used to control the flow rate of the rich liquid into the low pressure column in ASUs. PID controllers work well under steady state conditions, with only minor process variations, however, are typically detuned in order to avoid large oscillations in the plant conditions, which can lead to variations in flow rate and purity of the ASU plant products.

SUMMARY OF THE INVENTION

A cryogenic air separation unit includes an air intake, a first distillation column for receiving input air from the air intake and separating the air into outputs including a nitrogen rich vapor and an oxygen rich liquid. The first distillation column has a level of oxygen rich liquid during operation. A second, lower-pressure distillation column receives a flow of oxygen-rich liquid from the first distillation column and producing an argon-rich stream comprising oxygen and argon. The air separation unit includes at least one field element and an adaptive controller for controlling the at least one field element.

In an exemplary embodiment, the at least one field element is a flow control valve in the air separation unit. The flow control valve can be for controlling a flow into or out of the second, lower-pressure distillation column.

In another exemplary embodiment, the at least one field element is a flow control valve for controlling the flow rate of the oxygen-rich liquid received by the second distillation column from the first distillation column.

In exemplary embodiments, the adaptive controller is a model-based adaptive controller or a model-free adaptive controller.

The air separation unit can also include a crude argon column for separating argon from a mixture comprising argon and oxygen, wherein during operation, a portion of the oxygen-rich liquid produced by the first distillation column is fed to the crude argon column. In an exemplary embodiment, during plant upsets, the adaptive controller maintains the level of oxygen-rich liquid in the first distillation column at a desired level by adjusting the flow rate of oxygen-rich liquid into the second distillation column, whereby an argon content of the argon-rich stream from the low pressure column remains at a desired argon content.

In another exemplary embodiment, the at least one field element is a flow control valve for controlling a flow comprising oxygen from the second distillation column. A portion of the flow of oxygen from the second distillation can be vented, and the adaptive controller can control the flow rate of the vented oxygen. A portion of the flow of oxygen from the second distillation can be product, and the adaptive controller can control the flow rate of the product oxygen.

In another exemplary embodiment, the air separation unit can also include a regulatory controller for controlling the least one field element; and a switch for switching control of the at least one field element between the regulatory controller and the adaptive controller.

In an exemplary embodiment, the air separation unit also includes a distributed control system. The adaptive controller sends a signal to the distributed control system, the signal being indicative of a connection or a disconnection between a computer station and the distributed control system, and wherein, in response to receiving a signal indicating disconnection, control is switched to the regulatory controller or to a manual controller.

An exemplary embodiment of an air separation unit includes an air intake; a first distillation column for receiving input air from the air intake and separating the air into outputs including a nitrogen rich vapor and an oxygen rich liquid, the first distillation column having a level of oxygen rich liquid during operation; a second distillation column for receiving a flow of oxygen-rich liquid from the first distillation column and producing an argon-rich stream comprising oxygen and argon, the second distillation column being operational at a pressure lower than an operating pressure of the first distillation column; an adaptive controller for controlling a flow rate of oxygen-rich liquid produced by the first distillation column into the second distillation column, wherein during plant upsets, the adaptive controller maintains the level of oxygen-rich liquid in the first distillation column at a desired level by adjusting a flow rate of the oxygen-rich liquid into the second distillation column, and the argon content of the argon-rich stream from the second distillation column is maintained at a desired argon content. The plant upsets can be changes in temperature, humidity, flow rate, or pressure of the air received from the air intake or changes in a target production level of the air separation unit, or other known or unknown variations. The air separation unit can also include an argon distillation column, wherein in response to receiving a portion of the oxygen-rich liquid produced by the first distillation column and an argon-rich flow from the second distillation column, the argon distillation column produces an oxygen-rich output flow and argon-rich output flow having an argon content higher than an argon content of the argon-rich flow from the second distillation column.

An exemplary method for controlling the level of an oxygen-rich liquid in a first cryogenic distillation column of an air separation unit includes adjusting a flow rate of an oxygen-rich liquid reflux from the first cryogenic distillation column to a second, lower-pressure cryogenic distillation column with an adaptive controller responsive to the level of the oxygen-rich liquid. In another exemplary embodiment, during plant upsets, the step of adjusting the flow rate maintains the argon composition of an argon-rich output flow from the low pressure distillation column at a desired content and maintains a level of an oxygen-rich liquid in the high pressure distillation column at a desired level. In another exemplary embodiment, the method includes switching control of the flow rate from the adaptive controller to a regulatory controller responsive to the level of the oxygen-rich liquid in the first distillation column or to a manual controller. The method can also include identifying whether a distributed control system is receiving a signal from the adaptive controller, the signal being indicative of a connection between a computer station and a distributed control system, and switching control from the adaptive controller to a regulatory controller or to a manual controller based upon the signal received from the adaptive controller. The adaptive controller can be a model-based adaptive controller or a model-free adaptive controller.

Another exemplary method is for controlling a flow rate of an oxygen-rich flow from a low pressure column of an air separation unit, wherein the air separation unit has an air intake; a first distillation column for receiving air from the air intake and separating the air into a nitrogen-rich vapor and an oxygen-rich liquid; and a second distillation column operational at a pressure lower than an operating pressure of the first distillation column, wherein during operation, the second distillation column receives a flow of oxygen-rich liquid produced by the first distillation column and produces an output flow of oxygen; the method including: controlling with an adaptive controller the flow rate of the output flow of oxygen from the low pressure distillation column so that a pressure within the low pressure distillation column remains at a desired pressure.

BRIEF DESCRIPTION OF THE DRAWINGS

Other objects and advantages of the present invention will become apparent to those skilled in the art upon reading the following detailed description of the referred embodiments, in conjunction with the accompanying drawings, wherein like reference numerals have been used to designate like elements, and wherein.

DETAILED DESCRIPTION OF THE PREFERRED EMBODIMENTS

Air separation units separate components of air into gas and/or liquid outputs, including, for example, oxygen, nitrogen, argon, and other components, as desired, by cooling, liquefying, and distilling air.

Figure 1:
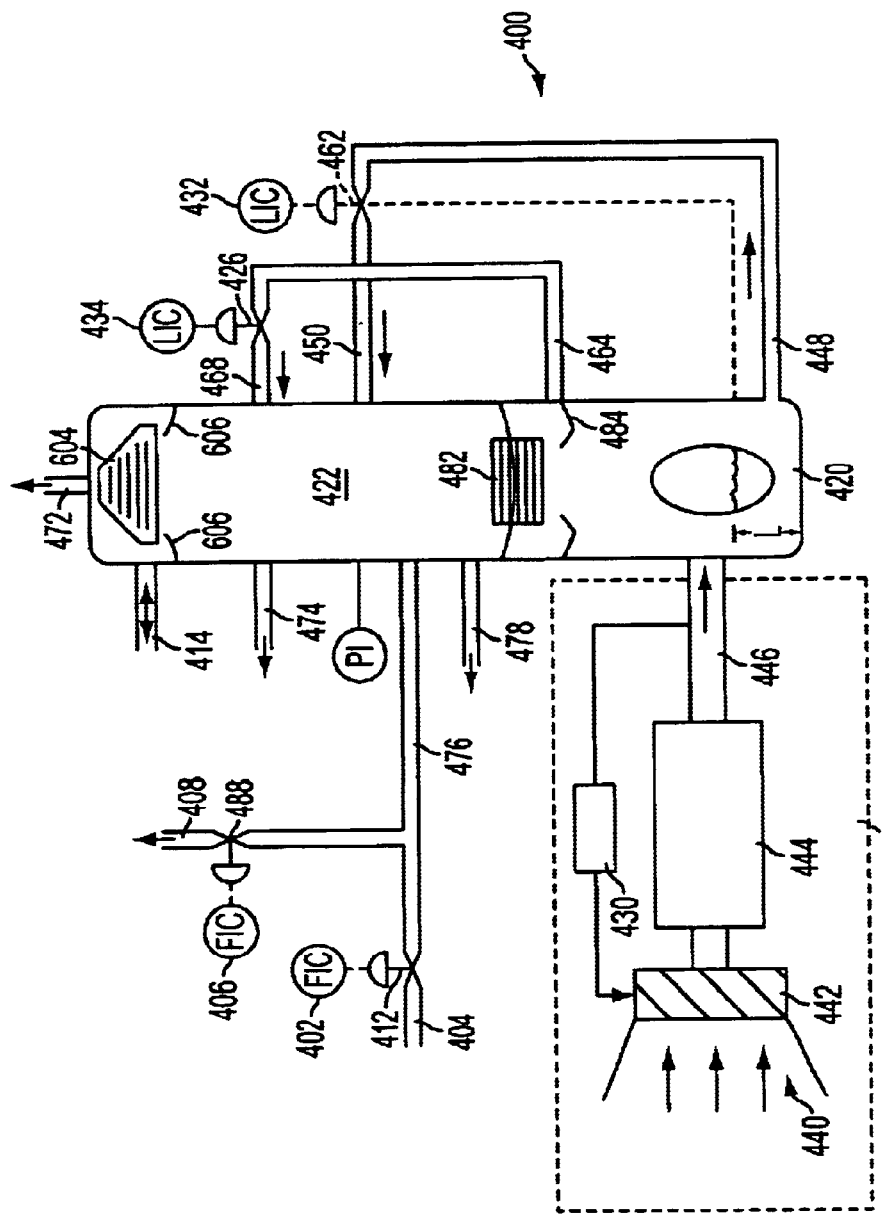
FIG. 1 is a schematic of an exemplary Air Separation Unit for use in an exemplary embodiment of the invention.

A typical air separation unit 400, shown in FIG. 1 can be configured such that filtered atmospheric air is brought into the plant via an air input subsystem 410. The air input subsystem 410 can include elements such as an air inlet 440 with guide vanes 442, and additional air treatment components such as, for example, an air compressor, a dryer for drying the air, and a cooler. The dryer can use molecular sieves, adsorption beds, dessicants, or front-end reversing exchangers that are regenerated or cleaned on a periodic basis. In an exemplary embodiment, a dryer can use using a stream of waste nitrogen from another component within the air separation unit. The cooler can be a high efficiency main heat exchanger. A flow of cool, dry, high pressure air 446 is directed into the high pressure cryogenic distillation column 420. In an exemplary embodiment, the air enters the high pressure column 420 at a temperature of about −274° F.

The ASU of FIG. 1 also includes a low pressure cryogenic distillation column 422, which shares a main condenser 482 with the high pressure cryogenic distillation column 420. Alternatively, the low pressure column 422 and the high pressure column 420 can also be separate units.

The low pressure cryogenic distillation column 422 typically operates at pressures of 4–15 psi, although higher or lower pressures are also possible. The high pressure cryogenic distillation column 420, which can also be known as a "medium pressure" column, operates at about a pressure which is about seven or eight times the operating pressure of the low pressure column, although higher or lower pressures can be used.

In the high pressure cryogenic distillation column 420, nitrogen is separated from the cooled, high pressure air 446, and nitrogen-rich vapor condenses at the condenser 482. The condensed nitrogen-rich vapor is collected in collection devices such as troughs 484. An output flow 464 (called LIN reflux, or "pure" nitrogen reflux) containing primarily the condensed nitrogen, is drawn from the high pressure column 420 and becomes feed 468 for the low pressure cryogenic distillation column 422. A valve 426 controls the flow rate of the LIN reflux flow 468 into the low pressure column 422.

The bottom of the high pressure cryogenic distillation column 420 contains oxygen-rich liquid (called rich liquid). Typically, the collected rich liquid ("bottoms") at the bottom of the column is about 40% oxygen. This rich liquid can be drawn off and used for various purposes. As shown in FIG. 1, an oxygen-rich liquid stream 448 is drawn from the high pressure column 420 so that it can be used as feed 450 for the low pressure column 422. The rich liquid 448 can also be drawn from the high pressure column as feed for other ASU components, or as a product, although this is not shown in FIG. 1.

The feeds 456 and 468 to the low pressure column 422 are the rich liquid 464 from the high pressure column 420, the LIN reflux 468 from the high pressure column 420. Additional nitrogen rich flow 414 ("LIN assist") can also be provided to the low pressure column 422 from another source, such as an auxiliary tank (not shown).

The bottom of the low pressure cryogenic distillation column 422 contains pure liquid oxygen (LOX), which may be drawn off as output 478 from the ASU. Gaseous oxygen within the low pressure cryogenic distillation column 422 can be drawn off as gaseous oxygen (GOX) output 476 directly above the liquid oxygen level in the low pressure column 422. The top of the low pressure cryogenic distillation column contains pure gaseous nitrogen, referred to as low-pressure nitrogen, which can be drawn off as a product 472. In addition, a waste nitrogen stream 474 can be drawn off from the low pressure column 422.

Figure 2:
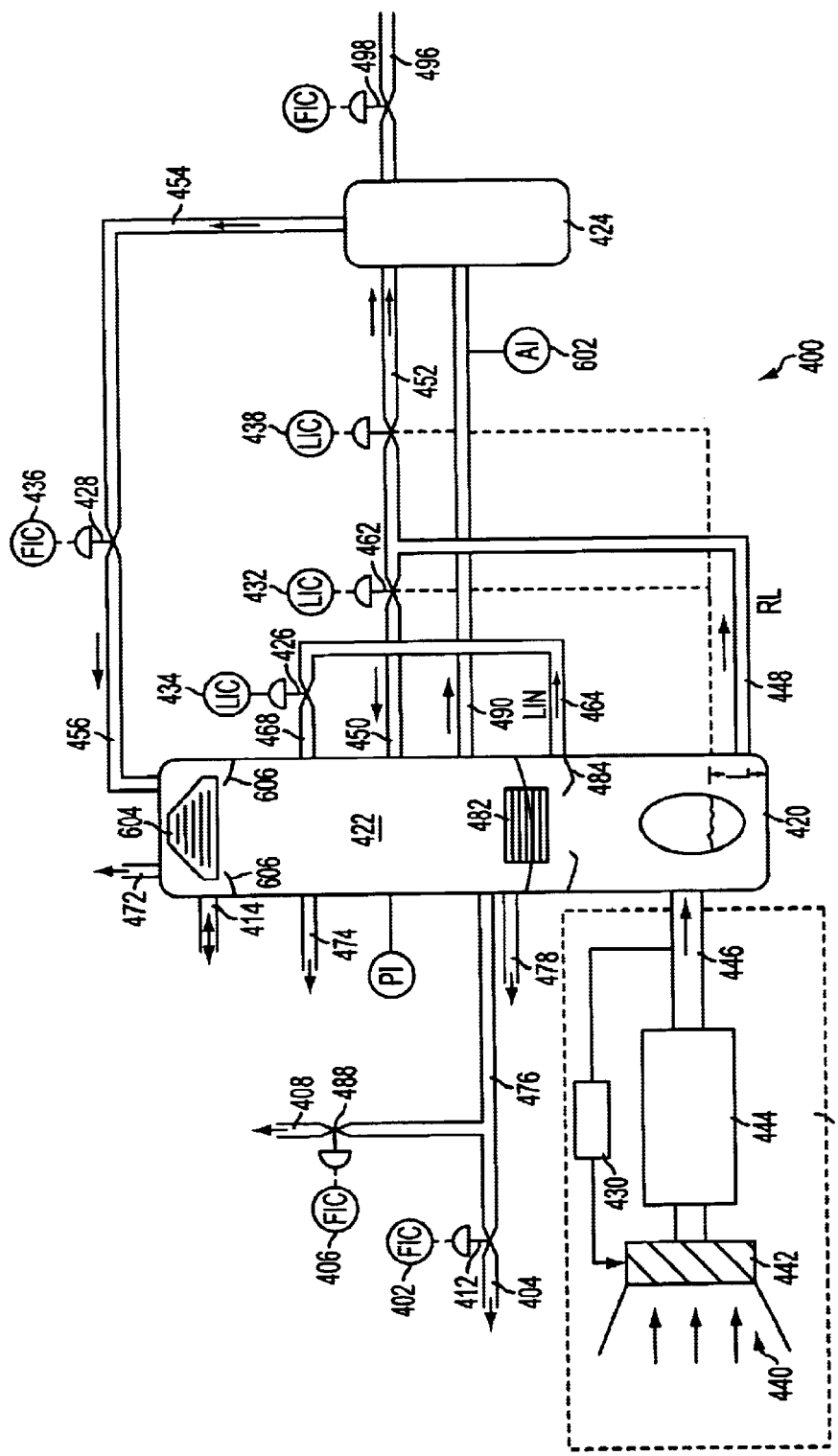
FIG. 2 is a schematic of another exemplary Air Separation Unit for use in an exemplary embodiment of the invention.

In the exemplary embodiment of FIG. 2, the ASU includes a crude argon column 424, which receives as feed 452 a portion of the rich liquid reflux 464 from the high pressure column. A stream 490 containing primarily oxygen and argon (called an "argon-rich oxygen flow" or "raw argon") is drawn from the low pressure column 422 and supplied as reflux to the crude argon column 424. In an exemplary embodiment, the raw argon stream 490 contains approximately 8–9% argon and 91–92% oxygen, although the ratio of argon to oxygen can be higher or lower. The crude argon column 424 produces a flow containing primarily oxygen (vaporized oxygen-rich liquid reflux) 454, which can be fed to the low pressure column. The crude argon column 424 also produces an argon-rich flow 496 ("crude argon") as a product which has a greater percentage of argon than the raw argon 490. Optionally, the crude argon 496 produced by the crude argon column 424 can be further processed in another processing unit, such as a "pure argon" column, although this is not shown.

In the system of FIG. 2, the feeds 456 and 468 to the low pressure column 422 are the rich liquid 450 from the high pressure column 420, the LIN reflux 468 from the high pressure column 420, and the vaporized nitrogen-rich liquid reflux 456 (LIN) from the crude argon column 424.

A stream of condensed nitrogen can be condensed by the condenser 604 within the low pressure column 422, collected at a trough 606, and drawn from the low pressure column as a nitrogen-rich product 414. Alternately, a nitrogen-rich flow 414 can supplied to the low pressure column 422 as "LIN assist".

As shown in FIGS. 1 and 2, the gaseous oxygen 476 can be either vented to the atmosphere ("GOX vent", 408), or can be a product provided to a customer ("GOX customer", 404), or both.

As will be clear to one skilled in the art, many other configurations of air separations units may be formed, producing greater or fewer types of products.

Air separation units are controlled by a plurality of field elements, such as valves, pumps, compressors, guide vanes, and other devices. The field elements are controlled by controllers, which can be of various types including, for example, traditional regulatory controllers such as proportional-integral-differential (PID) controllers, deadband controllers, gap controllers, or hand indicating controllers (HICs). The setpoints for the controllers may be entered either by human operators or by another (e.g., higher level) controller, or both. Regulatory controllers regulate the field elements of the ASU plant with high-speed control algorithms (typically less than one second) at setpoints for the regulatory controllers.

As an example, in FIGS. 1 and 2, a controller 430 can be used to control the guide vanes of the air intake 442 to adjust the flow of air 446 into the high pressure cryogenic distillation column 420. In the exemplary embodiment of FIGS. 1 and 2, the controller 430 is a PID controller.

As another example, in FIGS. 1 and 2, a controller 434 controls the valve 426 that adjusts the flow rate of the LIN flow 468 to the low pressure cryogenic distillation column 422. A controller 432 controls the valve 462 that adjusts the flow rate of the rich liquid reflux 450 to the low pressure distillation column 422.

In the FIG. 2 embodiment, a controller 438 can be used to adjust the flow rate of the rich liquid reflux 452 from the high pressure column 420 to the crude argon column 424. A controller 436 can be used to control the valve 428 that adjusts the flow rate of the vaporized LIN flow 456 from the crude argon column 424 into the low pressure column 422.

Air separation units can be operated in a manner designed to maintain the quality of the products at a specified level, maximize the product yield (e.g., maximize oxygen, nitrogen, and argon produced from the incoming air feed), stabilize the process (e.g., adjust process conditions to maintain the ASU operation within process and equipment constraint limits, and minimize transient disturbances when the unit is being ramped to new feed or product targets), and maximize the feed throughput for a given energy consumption.

In the embodiment shown in FIG. 2, a good indicator of plant stability and production is the argon content or purity of the raw argon stream 490 that flows from the low pressure column 422 to the crude argon column 424. This argon content can be monitored by a composition analyzer ("AI") 602.

As shown in the exemplary embodiment of FIG. 2, the rich liquid 450 enters the low pressure column 422 above the location of the output for the raw argon flow 490. Accordingly, the flow rate of the rich liquid 450 into the low pressure column 422 can have a significant effect on the purity of the raw argon flow 490 from the low pressure column 422.

In addition, the composition of the outputs from the low pressure column 422 depends on the pressure within the low pressure column. Increasing the pressure of the low pressure column 422 has a dramatic effect on the purity of the raw argon flow 490. Disturbances or variations in the pressure of the high pressure column 420 causes disturbances or variations in the low pressure column 422 because of the tight interaction between the columns. Disturbances in the low pressure column 422 are to be avoided as much as possible, in order to maintain the argon content of the raw argon flow 490, and the purity of the other outputs, at the desired purity or content levels.

Therefore, in order to produce a steady flow of high purity outputs, the air separation unit 400 can be operated with the goal of controlling the rich liquid reflux level L in the high pressure column 420 as close to a desired liquid level as possible, with few variations from the desired liquid level. A nearly constant rich liquid reflux level is intended to maximize the product recovery, maintain the product quality, and minimize the energy consumption of the ASU. It is also desirable to maintain the level as much as possible even during plant upsets.

Traditional regulatory controllers, such as PID controllers, can be used to control various flow rates in an air separation unit 400. For example, PID controllers have been used to control the flow rate of the rich liquid into the low pressure column in ASUs. PID controllers work well under steady state conditions, with only minor process variations. Further, PID controllers can be tuned for the particular application.

Overly tight control of the level L in the high pressure column 422 can tend to produce large oscillations in the rich liquid reflux flow from the high pressure column, due to interactions within the air separation unit. The large oscillations in the rich liquid reflux can cause a lower product yield, particularly if they cause large variations in the pressure within the high pressure or low pressure columns. Therefore, it can be difficult to control the high pressure column level by manipulating the reflux flow using a tightly tuned traditional regulatory controller, such as a PID controller.

Accordingly, a PID controller in this application can be operated "detuned", so that it will change the flow rate 450 slowly in response to changes in the liquid level L in the high pressure column 420. Under nearly steady-state conditions, a detuned PID controller controlling the flow 450 of oxygen-rich liquid into the low pressure column will maintain the flow rate of rich liquid 450 into the low pressure column 422 so the pressure of the low pressure column 422 is maintained at a desired pressure, so that the purity of the outputs from the low pressure column 422 will remain within desired ranges. If minor variations in plant conditions occur, the high pressure column 420 can act as a buffer tank, to hold any excess rich liquid that is produced in the high pressure column 420 as a result of the variations in plant conditions.

Variations in plant conditions can include changes in the temperature or humidity of the incoming air due to weather, changes in temperature throughout the day, or other changes in the environment. For example, when the adsorption beds are cycled, the humidity of the incoming air is affected.

When larger plant upsets occur, a "detuned" PID controller allows the rich liquid level L in the high pressure column 420 to vary considerably. These larger variations in the rich liquid level L can lead to large oscillations in other plant processes.

In an exemplary embodiment of the present invention, an adaptive controller is used to control the flow 450 of the rich liquid into the low pressure column 422. The adaptive controller 432 operates to maintain the level L in the high pressure column 420 as steady as possible. As shown in FIGS. 1 and 2, the adaptive controller 432 controls the oxygen-rich liquid reflux 450 which feeds the low pressure column 422 by controlling the flow valve 462.

The adaptive controller 432 can be any type of adaptive controller suitable for providing tight control of the liquid level L of the high pressure column 420 by adjusting of a flow rate. An adaptive controller is a feedback control system that adjusts its output characteristics in responses to changes in the environment.

In the exemplary embodiment of FIG. 2, both the adaptive controller 432 and the regulatory controller 438 are shown as level-indicating controllers (LIC), responsive to the level L of the oxygen-rich liquid in the high pressure column 420.

In an exemplary embodiment, the adaptive controller 432 is a model-free adaptive controller, in which the equations governing the system are unknown or changing. In other exemplary embodiments, the adaptive controller 432 can also be a model-based adaptive controller.

Adaptive controllers can provide faster response time than multivariable predictive controllers. They are effective in multiple-input multiple-output control loops and in single-input single-output control loops. An adaptive controller which has a fast response time has several advantages.

In the FIG. 2 embodiment, the adaptive controller 432 rapidly changes the flow rate of the rich liquid flow 450 into the low pressure column 422 to maintain the level L of the high pressure column 420 as close to the desired liquid level as possible. The regulatory controller 438 for the rich liquid flow 452 into the crude argon column 424 will respond more slowly to the change in level L of the high pressure column 420. As a result, any additional flow from the high pressure column 420 necessary to maintain the level of the high pressure column 420 is primarily directed to the low pressure column 422, while the crude argon column 424 receives a rich liquid flow 452 that varies slowly. Thus, the crude argon column 424 experiences very little change in pressure, even during plant upsets, and therefore, the percentage of argon in the of the output argon flow 496 ("crude argon" flow) from the crude argon column 424 is maintained.

Further, because of the speed of response of the adaptive controller 432, the additional rich-liquid flow into the low pressure column 422 does not significantly affect the quality or flow rate of the outputs from the low pressure column 422, as presented below with reference to FIGS. 5 and 6.

Similarly, the adaptive controller 432 provides a rapid response to any changes in the level L of the rich liquid in the high pressure column 420, adjusting the flow rate of the oxygen-rich liquid 450 into the low pressure column 422 as necessary to maintain the level L as constant as possible.

In an exemplary embodiment, control for the rich-liquid reflux flow 450 into the low pressure column can include both an adaptive controller 432 and a traditional regulatory controller such as a PID controller, with a switch so that control can be switched between them when necessary. In an exemplary embodiment, the valve 462 controlled by a PID and/or adaptive controller and other flow control valves within the ASU can also be adjusted manually. Adaptive controllers can be used to control other field elements in the air separation unit 400. In an exemplary embodiment, an adaptive controller can control the flow rate of an gaseous oxygen (GOX) flow 476 from the low pressure column 422. For example, an adaptive controller 402 can control the GOX flow 404 to a customer. An adaptive controller 406 can also control the GOX flow 408 which is vented to the environment. If the valves 412 and 488 used are butterfly valves, the flow 408 and 404 will tend to be difficult to control at higher flow rates. This can result in fluctuations of pressure in the low pressure column 422, which will affect product yields.

In an exemplary embodiment, adaptive controllers 406 and 402 provide rapid and effective control over the valves 488 and 412 that adjust the oxygen flows 404 and 408 from the low pressure column 422.

Of course, adaptive controllers can also be used in other control applications in an ASU.

Figure 3:
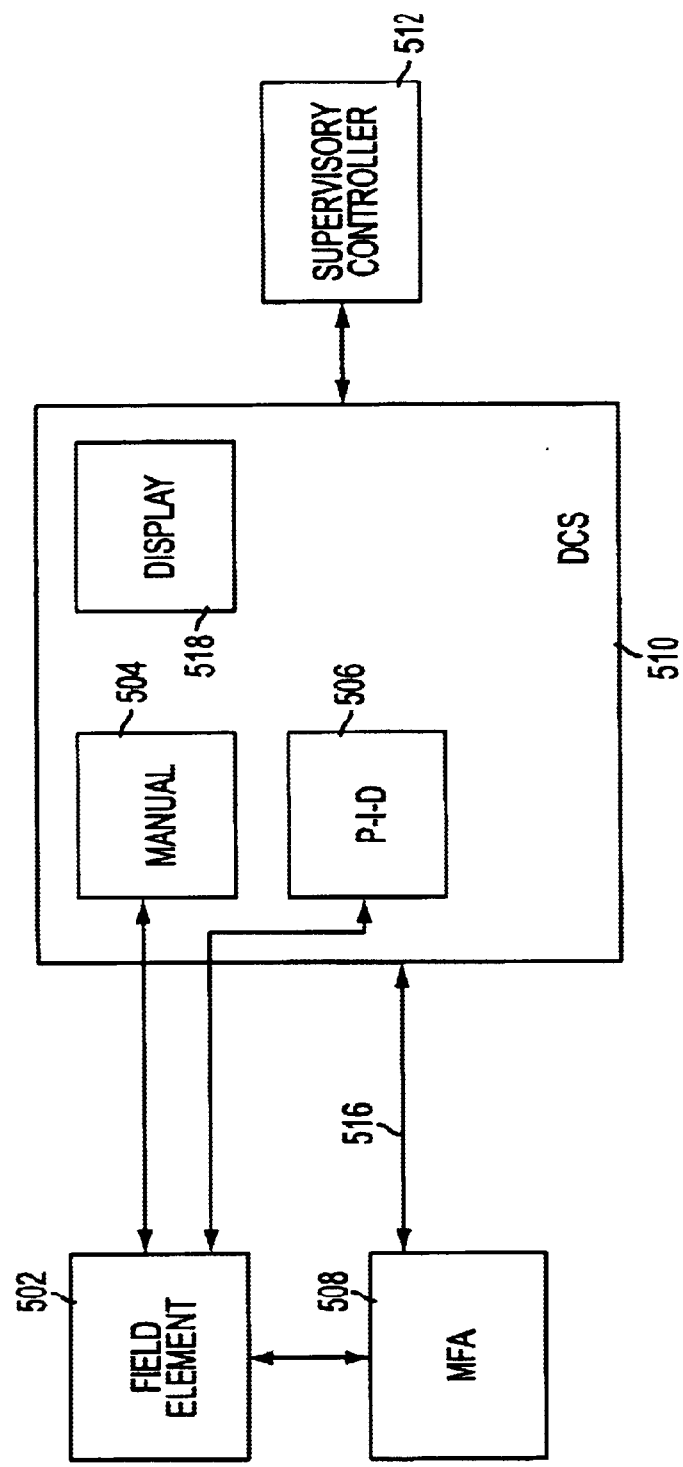
FIG. 3 illustrates an exemplary control system for an Air Separation Unit.

FIG. 3 illustrates one embodiment of a control system suitable for an air separation unit. A field element 502, has manual control 504, regulatory control in the form of a PID controller 506, and an adaptive controller 508. The manual controller, PID controller, and adaptive controller can be part of a distributed control system 510 ("DCS") for the ASU, or can be connected to the distributed control system 510. The DCS 510 has a user station with a display 518. The DCS 510 can receive a target production level from a supervisory controller 512 for the air separation unit, or the target production level can be set by a plant operator. The computer station 514 is in communication with the adaptive controller 508, and has an interface 516 with the distributed control system 510.

The supervisory controller 512 can be part of the distributed control system 510, or can be external to the DCS 510, as part of a network and/or multivariable control system.

The field element 502 can be the rich liquid reflux flow control valve 462, the argon flow control valve 488, the argon flow control valve 488 of FIGS. 1 and 2, or any other suitable field element in an air separation unit.

In an exemplary embodiment, the adaptive controller 508 sends a signal to the distributed control system 510 indicating whether the connection between the computer station 514 and the distributed control system 510 is on or off. If this signal indicates that the connection is off, the distributed control system can switch control from the adaptive controller 436 to the traditional regulatory controller 506 or to manual control 504. An alarm can also be included which will warn operators of this condition.

Figure 4:
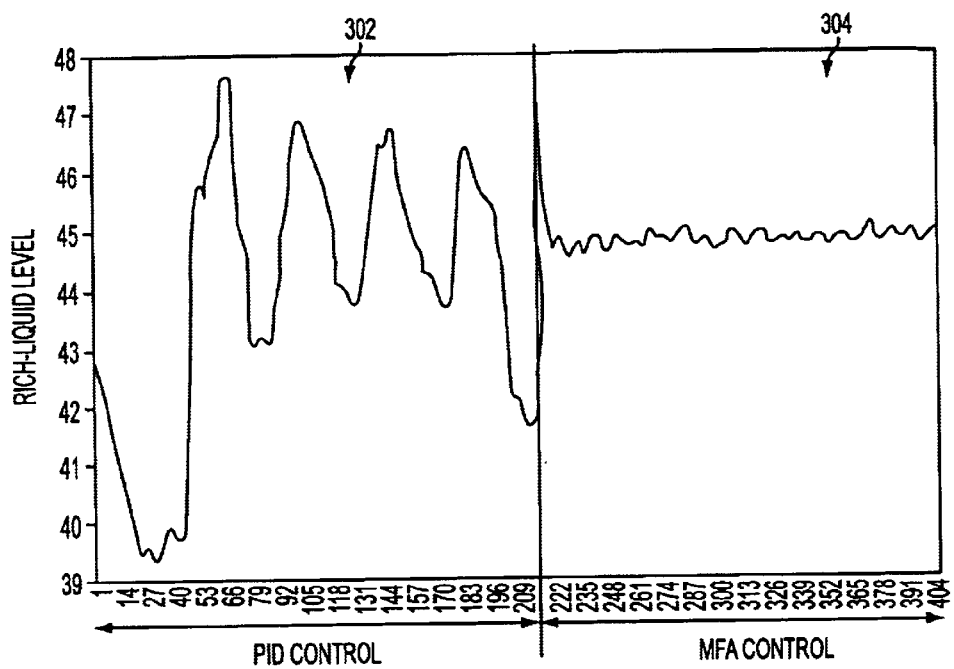
FIG. 4 is a graph illustrating variations in rich liquid level in the high pressure column under PID and MFA control.

FIGS. 4, 5, 6, 7a, and 7b illustrate the advantages of using an adaptive controller in an air separation unit, and in particular, to control the flow rate of the rich liquid reflux in an air separation unit. FIG. 4 shows the rich liquid level L manipulated by a PID controller at 302 and then after being switched to control by a model-free adaptive (MFA) controller at 304. The MFA controlled flow 304 has much smaller swings in the flow rate of the rich liquid, illustrating that the control is greatly improved by the model free adaptive controller.

Figure 5:
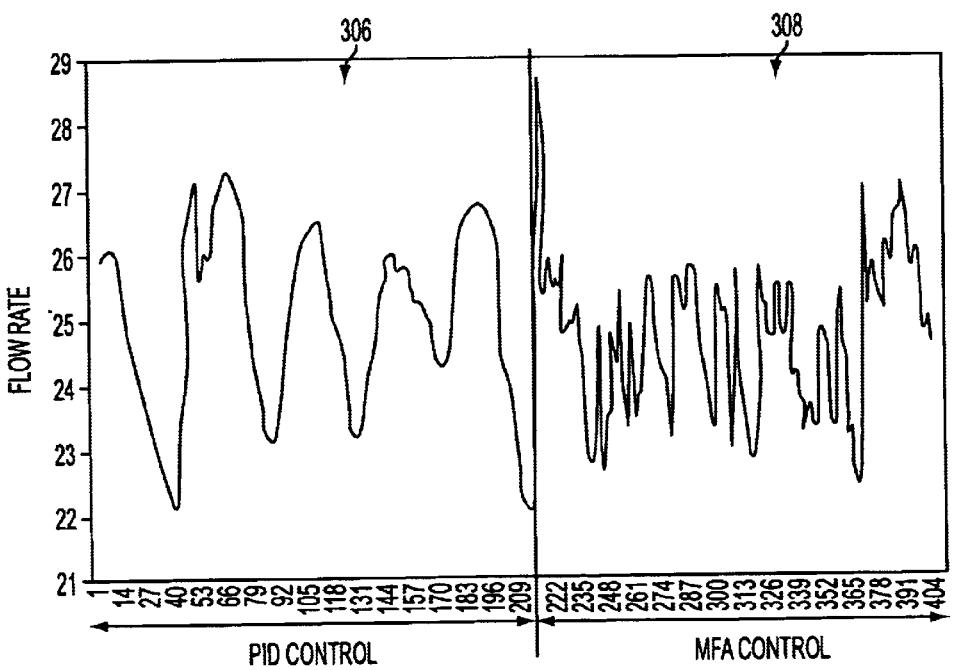
FIG. 5 is a graph illustrating the rich liquid reflux flow into the low pressure column under PID and MFA control.

FIG. 5 illustrates flow rate of the rich liquid 450 into the low pressure column 422 under a PID controller and a MFA controller. The graph of FIG. 5 plots the flow output of the valve 462 under PID control 306, and under MFA control 308. The output of the valve 462 under MFA control has a faster frequency response and has a more intelligent pattern than under PID control. The frequency of flow rate changes is greater under MFA control, but the magnitude of the amplitude changes is smaller. By comparing the area under the curve in FIG. 5 under MFA control and under PID control, it is clear that the total variation in flow into the low pressure column is smaller under MFA control than under PID control. This pattern of flow rate fluctuation under MFA control reduces overall variation of the reflux flow, and therefore minimizes the effects of the variations on the flow rate and purity of the outputs from the low pressure column.

Figure 6:
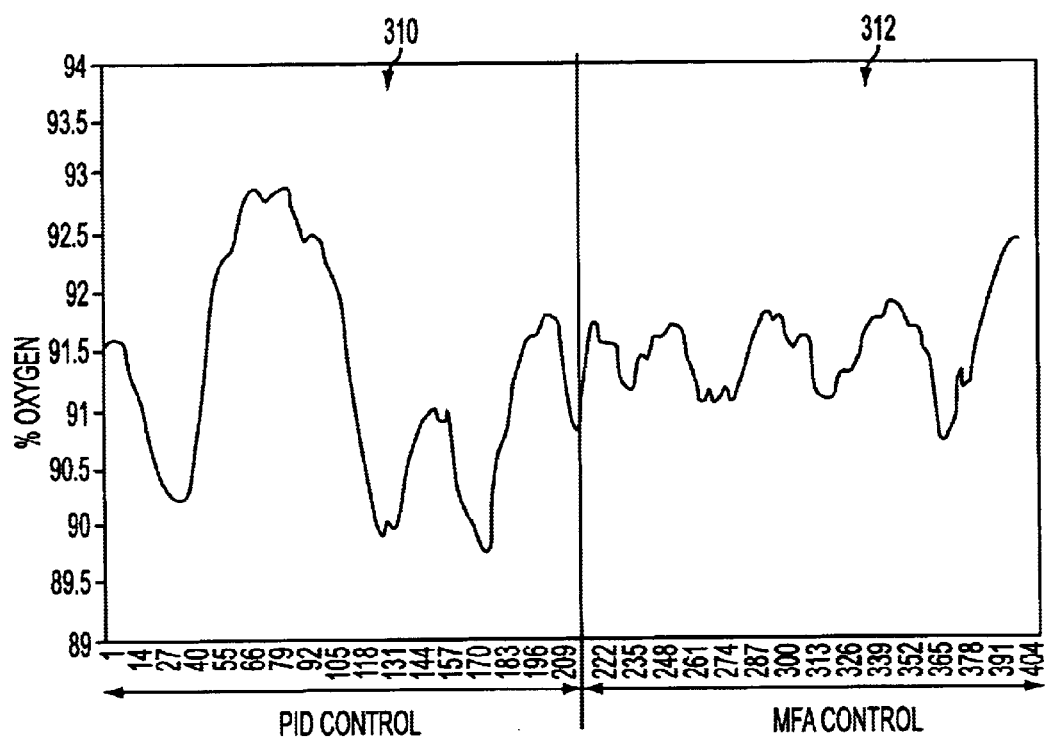
FIG. 6 is a graph illustrating the purity of the raw argon flow under PID and MFA control.

FIG. 6 illustrates the purity of the argon-rich oxygen flow 490 from the low pressure column 422 (the "principal column purity") under PID control and under MFA control. The y-axis of the graph in FIG. 6 is the percentage of oxygen in the argon-rich flow oxygen flow 490. Under PID control, the percentage of oxygen 310 in the flow 490 has large swings between about 89.7% and 93%, while under MFA control, the percentage of oxygen 312 varies between about 90.8% and 92.5%. Notice that under MFA control, the overall purity of the argon-rich flow is more consistent than under PID control, with better average purity and few low purity periods.

Figure 7A:
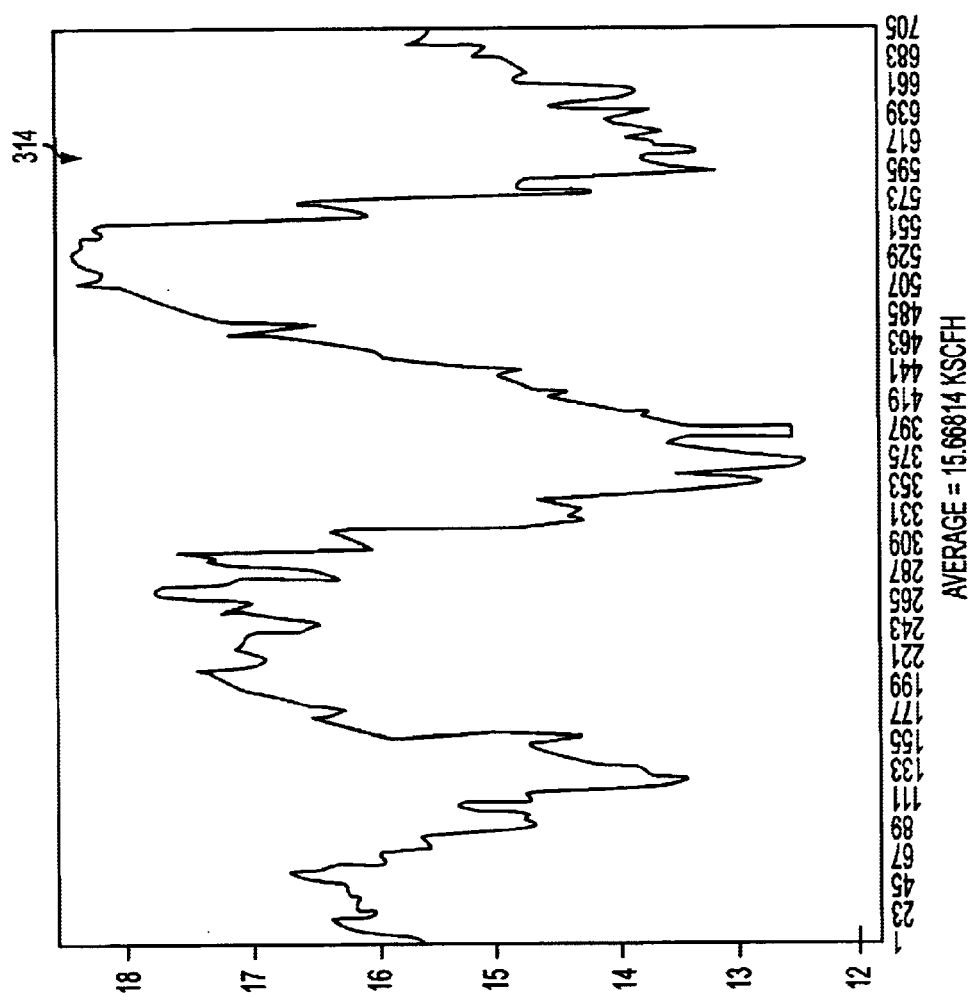
FIGS. 7a and 7b are graphs illustrating the argon production from an crude argon column under PID and MFA control.
Figure 7B:
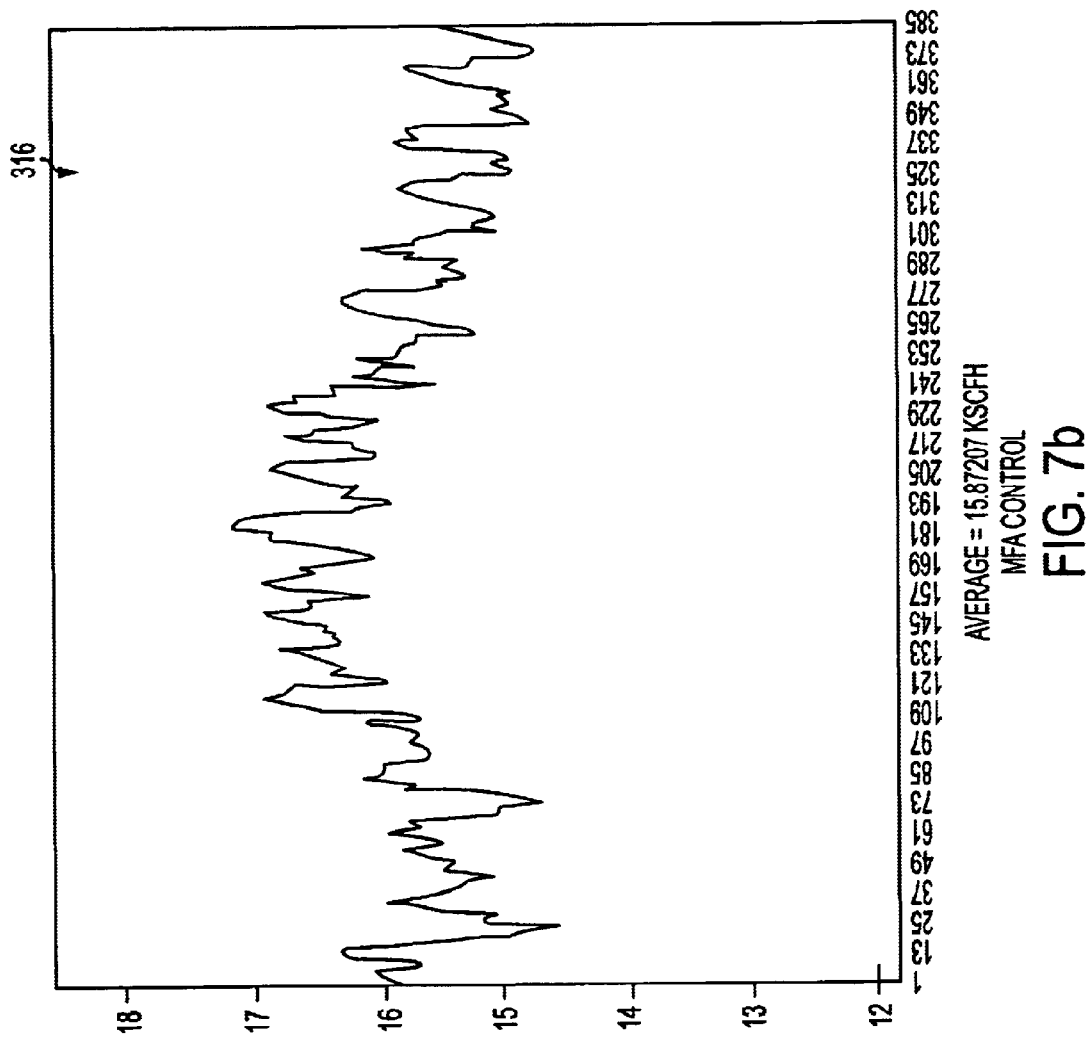

FIGS. 7a and 7b illustrate the improvement in gas flow 316 with a MFA controller compared to the flow 314 using a detuned PID controller. The measured flow is the argon produced by the crude argon column, e.g. the crude argon flow 496 measured downstream of the valve 498 as illustrated in FIG. 2. The average gas flow with a MFA controller was 15.87 KSCFH (thousands of standard cubic feet per hour) compared to 15.68 KSCFH for the same ASU with a detuned PID controller, or approximately a 1.3% increase.

The use of model-free adaptive controllers provides several advantages. For example, it is not necessary to know precise quantitative knowledge of the process. In addition, no process identification mechanism is needed. Further, no controller design for a specific process is required. No complicated manual tuning is required.

An exemplary example of a suitable model-free adaptive controller is the model free adaptive controller described in U.S. Pat. No. 6,055,524, issued to Cheng, an embodiment of which is available from General Cybernation Group, Inc., in Rancho Cordova, Calif., under the trade name CyboCon Model-Free Adaptive Controller. The disclosure of U.S. Pat. No. 6,055,524 is hereby incorporated by reference in its entirety.

Suitable model-based adaptive controllers for use in an air separation unit are available under the trade name Brain-Wave from Universal Dynamics Technologies Inc., Richmond, British Columbia, Canada, although other model-based adaptive controllers can be used.

Software for an adaptive controller can be implemented at a computer station with an interface to the distributed control system. The computer station can be, for example, a personal computer. For the model-free adaptive controller from General Cybernation Group, the software package CyboSoft can be installed and run on a personal computer with a Windows NT operating system. Additional information is included in George S. Cheng, MFA in Control with CyboCon, CyboSoft, General Cybernation Group Inc., March 2000, and in Dave S. Seiver and Les Dupre, "A Pyramid Approach to Advanced Control", Control Magazine, July 2000, each of which is incorporated by reference herein it its entirety.

Installation of adaptive controllers for field elements in an air separation unit provides improvements in all controlled variables. Installation is quickly accomplished, and return on investment is high.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive, and the scope of the invention is to be determined by reference to the appended claims. Each of the aforementioned published documents are incorporated by reference herein in its entirety.

What is claimed is:

1. A cryogenic air separation unit comprising:
   an air intake;
   a first distillation column for receiving input air from the air intake and separating the air into outputs including a nitrogen rich vapor and an oxygen rich liquid, the first distillation column having a level of oxygen rich liquid during operation;
   a second distillation column for receiving a flow of oxygen-rich liquid from the first distillation column and producing an argon-rich stream comprising oxygen and argon, the second distillation column being operational at a pressure lower than an operating pressure of the first distillation column;
   at least one field element;
   and an adaptive controller for controlling the at least one field element.

2. An air separation unit as in claim 1, wherein the at least one field element is a flow control valve in the air separation unit.

3. An air separation unit as in claim 2, wherein the flow control valve controls a flow into or out of the second distillation column.

4. An air separation unit as in claim 1, wherein the adaptive controller is a model-based adaptive controller.

5. An air separation unit as in claim 1, wherein the adaptive controller is a model-free adaptive controller.

6. An air separation unit as in claim 1, wherein the at least one field element is a flow control valve for controlling the flow of oxygen-rich liquid received by the second distillation column.

7. An air separation unit as in claim 1, further comprising:
   a crude argon column for separating argon from a mixture comprising argon and oxygen,
   wherein during operation a portion of the oxygen-rich liquid produced by the first distillation column is fed to the crude argon column.

8. An air separation unit as in claim 7, wherein during plant upsets, the adaptive controller maintains the level of oxygen-rich liquid in the first distillation column at a desired level by adjusting the flow rate of oxygen-rich liquid into the second distillation column, and wherein an argon content of the argon-rich stream from the low pressure column remains at a desired argon content.

9. An air separation unit as in claim 1, wherein the at least one field element is a flow control valve for controlling a flow comprising oxygen from the second distillation column.

10. An air separation unit as in claim 9, wherein at least a portion of the flow of oxygen from the second distillation is vented, and wherein the adaptive controller controls the flow rate of the vented oxygen.

11. An air separation unit as in claim 9, wherein a portion of the flow of oxygen from the second distillation is a product, and wherein the adaptive controller controls the flow rate of the product oxygen.

12. An air separation unit as in claim 1, wherein the at least one field element is a flow control valve for controlling a flow of gaseous oxygen from the second distillation column.

13. An air separation unit as in claim 1, further comprising:
a regulatory controller for controlling the least one field element; and
switching means for switching control of the at least one field element between the regulatory controller and the adaptive controller.

14. An air separation unit as in claim 13, further comprising a distributed control system.

15. An air separation unit as in claim 14, wherein the adaptive controller sends a signal to a distributed control system, the signal being indicative of a connection or a disconnection between a computer station and the distributed control system, and wherein, in response to receiving a signal indicating disconnection, control is switched to the regulatory controller or to a manual controller.

16. An cryogenic air separation unit comprising:
an air intake;
a first distillation column for receiving input air from the air intake and separating the air into outputs including a nitrogen rich vapor and an oxygen rich liquid, the first distillation column having a level of oxygen rich liquid during operation;
a second distillation column for receiving a flow of oxygen-rich liquid from the first distillation column and producing an argon-rich stream comprising oxygen and argon, the second distillation column being operational at a pressure lower than an operating pressure of the first distillation column;
an adaptive controller for controlling a flow rate of oxygen-rich liquid produced by the first distillation column into the second distillation column,
wherein during plant upsets, the adaptive controller maintains the level of oxygen-rich liquid in the first distillation column at a desired level by adjusting a flow rate of the oxygen-rich liquid into the second distillation column, and the argon content of the argon-rich stream from the second distillation column is maintained at a desired argon content.

17. An air separation unit as claim 16, wherein the plant upsets are changes in temperature, humidity, flow rate, or pressure of the air received from the air intake or changes in a target production level of the air separation unit.

18. An air separation unit as in claim 16, comprising:
an argon distillation column,
wherein in response to receiving a portion of the oxygen-rich liquid produced by the first distillation column and an argon-rich flow from the second distillation column, the argon distillation column produces an oxygen-rich output flow and argon-rich output flow having an argon content higher than an argon content of the argon-rich flow from the second distillation column.

19. An air separation unit as in claim 16, wherein the adaptive controller is a model-free adaptive controller.

20. An air separation unit as in claim 16, wherein the adaptive controller is a model-based adaptive controller.

21. A method for controlling the level of an oxygen-rich liquid in a first cryogenic distillation column of an air separation unit, the method comprising:
adjusting a flow rate of an oxygen-rich liquid reflux from the first cryogenic distillation column to a second, lower-pressure cryogenic distillation column with an adaptive controller responsive to the level of the oxygen-rich liquid.

22. A method as in claim 21, wherein during plant upsets, the step of adjusting the flow rate maintains the argon composition of an argon-rich output flow from the low pressure distillation column at a desired content and maintains a level of an oxygen-rich liquid in the high pressure distillation column at a desired level.

23. A method according to claim 21, comprising:
switching control of the flow rate from the adaptive controller to a regulatory controller responsive to the level of the oxygen-rich liquid in the first distillation column or to a manual controller.

24. A method as in claim 21, further comprising:
identifying whether a distributed control system is receiving a signal from the adaptive controller, the signal being indicative of a connection between a computer station and a distributed control system; and
switching control from the adaptive controller to a regulatory controller or to a manual controller based upon the signal received from the adaptive controller.

25. A method according to claim 21, wherein the adaptive controller is a model-free adaptive controller.

26. A method according to claim 21, wherein the adaptive controller is a model-based adaptive controller.

27. A method for controlling a flow rate of an oxygen-rich flow from a low pressure column of an air separation unit, wherein the air separation unit has an air intake; a first distillation column for receiving air from the air intake and separating the air into a nitrogen-rich vapor and an oxygen-rich liquid; and a second distillation column operational at a pressure lower than an operating pressure of the first distillation column, wherein during operation, the second distillation column receives a flow of oxygen-rich liquid produced by the first distillation column and produces an output flow of oxygen; the method comprising:
controlling with an adaptive controller the flow rate of the output flow of oxygen from the low pressure distillation column so that a pressure within the low pressure distillation column remains at a desired pressure.

28. A method as in claim 27, wherein the adaptive controller is a model-free adaptive controller.

29. A method as in claim 27, wherein the adaptive controller is a model-based adaptive controller.

* * * * *